No. 686,170. Patented Nov. 5, 1901.
C. N. WAITE.
PROCESS OF PURIFYING LACTIC ACID.
(Application filed Apr. 26, 1900.)
(No Model.)
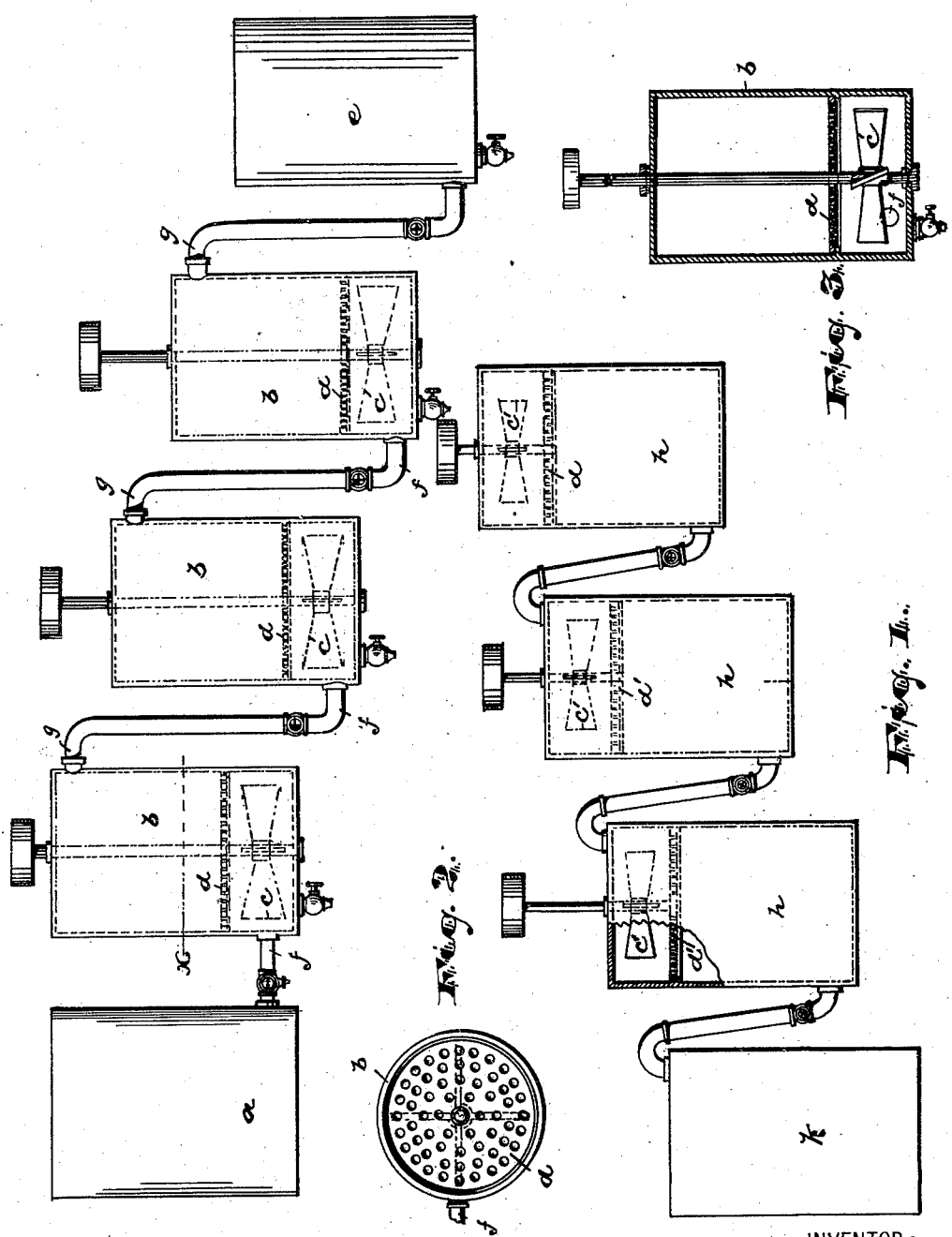

UNITED STATES PATENT OFFICE.

CHARLES N. WAITE, OF CRANFORD, NEW JERSEY.

PROCESS OF PURIFYING LACTIC ACID.

SPECIFICATION forming part of Letters Patent No. 686,170, dated November 5, 1901.

Application filed April 26, 1900. Serial No. 14,370. (No specimens.)

*To all whom it may concern:*

Be it known that I, CHARLES N. WAITE, a citizen of the United States, residing at Cranford, in the county of Union and State of New Jersey, have invented certain new and useful Improvements in Processes of Purifying Crude Lactic Acid; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in the art of manufacturing pure or approximately pure lactic acid, the objects of the invention being to facilitate the operation and reduce the cost of manufacturing lactic acid of a purity and freedom from foreign matters such as will make it fit for medicinal uses or such other uses as may require approximate chemical purity. The usual impurities found in crude lactic acid from which I obtain the pure or approximately pure acid are unfermented sugar, gums, nitrogenous matters, traces of lime salts, tarry coloring matter, &c.

The invention consists in the process or art of purifying crude lactic acid or removing the impurities therefrom, hereinafter described, and finally embraced in the clauses of the claim.

Referring to the accompanying drawings, in which like letters of reference indicate corresponding parts in each of the views, Figure 1 is a diagrammatic view of the apparatus employed in carrying out the process. Fig. 2 is a horizontal section of one of the mixing or washing chambers, and Fig. 3 is a vertical section of the same.

It must be understood that the apparatus of the drawings may be varied in arrangement and construction of parts without departing from the spirit or scope of the invention.

I find that when crude lactic acid and amyl alcohol, $C_5H_{11}OH$, (fusel oil,) are mixed by agitation or otherwise and then allowed to separate by gravity the alcohol, which is not a solvent of the ordinary impurities of crude acid, rises to the top, carrying with it lactic acid practically free from all impurities except a trace of coloring-matter. When equal bulks of crude acid and amyl alcohol separate after mixture, as above described, the alcohol contains about one-half as much acid as is left in the aqueous solution. The upper stratum of alcoholic solution is decanted and fresh alcohol is mixed with the crude acid remaining. This also is allowed to separate, and the alcoholic solution of acid is decanted as before, and this process is repeated until the acid is practically all removed from the impure aqueous solution. The aqueous residue may be heated to recover the dissolved alcohol and then thrown away. The alcoholic solution of acid may be treated in two ways. It may be mixed with pure water and distilled in the presence of aqueous vapor and the alcohol recovered, leaving the acid in pure aqueous solution, which may then be concentrated to any desired degree, and the tarry coloring matter may be removed by bone-black; or, and preferably, the alcoholic solution may be deprived of its acid by reversing the washing process and repeatedly washing the alcoholic solution with pure water, to which the alcohol gives up the acid, in the proportion of two parts of acid remaining in the water to one part left in the alcohol when equal bulks of each are used. When the alcohol has been practically freed from acid it may be used to wash out a fresh portion of crude acid. The pure aqueous solution is concentrated by boiling and decolorized as above described.

Instead of the washings being interrupted or repeated, I prefer to run the alcohol in a slow continuous stream through a series of vessels containing crude acid, as indicated in the drawings. The alcohol comes from the last vessel highly charged with acid. When the first vessel into which the fresh alcohol enters is exhausted of its acid it is emptied, refilled with fresh crude acid, and becomes the last of the series. In this way a continuous supply of highly-charged alcohol is obtained.

I find that crude acid containing about thirty per cent. of lactic acid is best for practical working.

In the reverse process of separating the purified acid from its alcoholic solution pure water is allowed to flow through a series of vessels containing the alcoholic solution, whereby a continuous supply of aqueous solution of high percentage is obtained and the alcohol in the first vessel is almost entirely stripped of its acid. This vessel is then emptied and refilled with alcoholic solution and becomes the last of the series, as described above, in process of washing out the crude acid.

In the drawings, a indicates a vessel charged with the crude watery solution of acid. b b b are vessels, in connection with the first said vessel and in connection with one another, into which amyl alcohol is placed, said vessels being preferably supplied with mixing wheels or arms c c c, driven by suitable power devices and also supplied with perforated partitions d d, below which the mixing wheels or arms are arranged. The inlet-pipe connections or ducts f enter the vessels b below said partitions and the exits g for the fluid lie at or near the tops of said vessels. The vessel e completes or may complete the first series and is for the alcoholic solution of the acid. The solutions, after having been mixed by the rotary wheels c, pass upward through the perforations of the partitions and separate in the quiet upper chambers, and the lighter alcoholic solution flows off to the next vessel in order.

In the second series of connected vessels h h h, for returning the acid to a watery solution void of amyl alcohol, the perforated partitions d' d' and mixing-wheels c' c' c' are arranged near the top of said vessels, and the fluids flow from the bottom of one vessel to the tops of the next in order. The vessel k serves as a final reservoir for the pure watery solution of acid.

Having thus described the invention, what I claim as new is—

1. The process or art of purifying crude lactic acid which consists in subjecting crude watery solution of lactic acid to amyl alcohol, separating the alcoholic solution from the aqueous solution and finally removing the amyl alcohol from the said alcoholic solution, substantially as set forth.

2. The process or art of purifying crude lactic acid which consists in mixing the crude solution of lactic acid with amyl alcohol and allowing the mixture to separate by gravity, and decanting the higher strata of fluid, and finally removing the amyl alcohol from the decanted fluid, substantially as set forth.

3. The process or art of manufacturing lactic acid from a crude solution, which consists in mixing the crude solution of lactic acid with amyl alcohol, allowing the mixture to separate into strata, the upper stratum being an alcoholic solution of the said acid, decanting the said upper solution and subjecting the same to pure water and removing from the new mixture the watery solution of lactic acid and evaporating the water, substantially as set forth.

4. The improvement in the art of purifying crude lactic acid which consists in washing the crude acid with amyl alcohol, and then distilling off the alcohol in the presence of aqueous vapor, substantially as set forth.

5. The improvement in the art of purifying crude lactic acid which consists in repeatedly washing the crude lactic acid with amyl alcohol, then repeatedly washing the alcoholic solution with pure water and concentrating the aqueous solution so obtained, substantially as set forth.

In testimony that I claim the foregoing I have hereunto set my hand this 7th day of April, 1900.

CHARLES N. WAITE.

Witnesses:
CHARLES H. PELL,
C. B. PITNEY.